C. J. WELLS.
Machine for Unloading Grain from Vessels.

No. 209,204.　　　　　　Patented Oct. 22, 1878.

Witnesses
Amos W. Sangster
Jerry Small

Inventor
Chandler J. Wells
per James Sangster
Atty

UNITED STATES PATENT OFFICE.

CHANDLER J. WELLS, OF BUFFALO, NEW YORK.

IMPROVEMENT IN MACHINES FOR UNLOADING GRAIN FROM VESSELS.

Specification forming part of Letters Patent No. 209,204, dated October 22, 1878; application filed October 3, 1878.

*To all whom it may concern:*

Be it known that I, CHANDLER J. WELLS, of Buffalo, in the county of Erie and State of New York, have invented certain new and useful Improvements in Machinery for Unloading Grain or other equivalent material from Vessels or Boats, which improvements are fully set forth in the following specification and accompanying drawings, in which—

Figure 1:
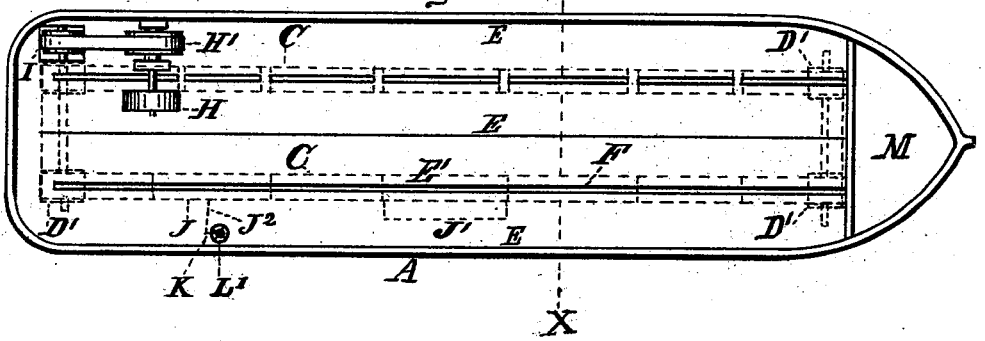
Figure 2:
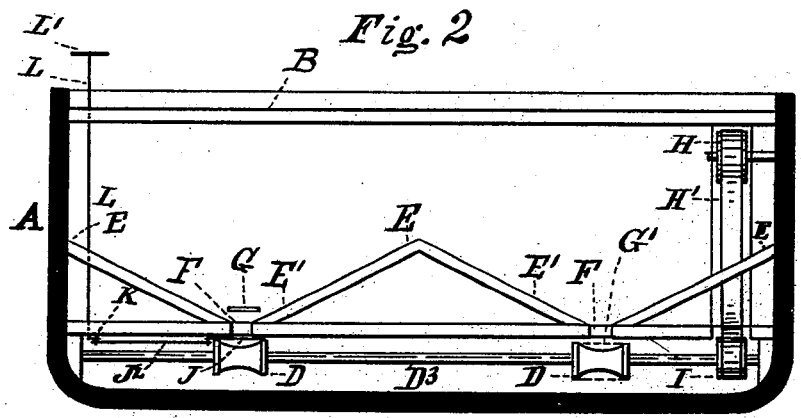
Figure 3:
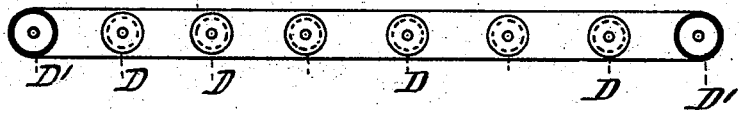

Figure 1 is a plan view of my apparatus as arranged below the deck of a boat. Fig. 2 is an enlarged section through line X, Fig. 1; and Fig. 3 represents a side elevation of one of the conveyers.

The object of this invention is to afford the means for rapidly and cheaply removing grain or other granular material from vessels or boats; and it consists, first, in providing the deck or floor of a vessel or other grain-holding device with one or more grooves or channels, having one or more openings at the bottom, and the sides of which are sufficiently inclined to allow grain or other similar material to pass or slide down into said opening, in combination with a suitable conveyer.

The second part of my invention consists in the combination of a grooved deck or floor, having openings at the bottom, with an adjustable slide or shut-off, whereby the size of the opening may be regulated or shut off entirely, so as to stop the flow of the grain or adjust the amount of flow.

The third part of my invention consists in the combination of said grooves or channels, having openings at the bottom, with a protecting plate, whereby they are partly relieved from the weight of the grain above, all of which will be more clearly hereinafter shown by reference to the drawing, in which—

A is the vessel or boat; B, the upper deck. (See Fig. 2.) C represents the conveyer, which is made of heavy canvas or other strong flexible material. It is arranged in the water-space near the bottom of the vessel, and is an endless belt supported on drums or rollers D′, and is kept in position horizontally by concave-faced rollers D. It receives its motion from pulleys H I and belt H′, or other equivalent gearing, and an engine suitable for the purpose. E represents the upper part of the groove or channel, and E′ the lower part. F is the opening at the bottom, and G the protecting-plate above it.

It will be readily seen that the grooves or channels may be more or less than I have shown, and that they may be arranged either lengthwise or transversely, and that the greater the number the less will be the vertical space required. By either arrangement the moving conveyer will receive the grain as it passes down the inclined sides of the grooves and through the openings, so as to carry it forward and deposit it in the elevator or other equivalent pit M, when it may be taken up by any well-known elevating apparatus.

There may be one continuous opening nearly the whole length of the boat, or a series of shorter openings may be arranged in the grooves. Of course the cross-beams supporting the grooved floor will divide the openings when arranged longitudinally.

To control the flow of the grain, I employ a shut or slide, J, or a series of them, (see Fig. 2,) arranged so as to be opened or closed from the upper deck of the vessel.

$J^2$ is a connecting-rod jointed to a slide, J, and a crank, K, as shown, which crank is connected to an upright rod, L, provided with a hand-wheel, L′, for turning it. In Fig. 1 I have shown one of these shuts or slides open by dotted lines $J^1$.

The object of the plate G (see Fig. 2) is to relieve the openings F and slide or conveyer below them from the pressure of the grain when the boat is heavily loaded and when the conveyer is not running.

I claim as my invention—

1. In a boat or suitable grain-carrying device, a grooved or channeled floor having openings F and sides sufficiently inclined for the grain to pass down, in combination with the conveyer, substantially as specified, to receive the grain and carry it therefrom.

2. The combination of a grooved or channeled floor, having openings F, with a shut-off, J, operated by means substantially as specified, and a conveyer, substantially as specified.

3. A grooved or channeled floor, having openings F, substantially as described, in combination with a protecting-plate, C, for the purposes set forth.

C. J. WELLS.

Witnesses:
 ROBT. DUNBAR,
 AMOS W. SANGSTER.